United States Patent [19]

Yamamoto et al.

[11] Patent Number: 4,900,060

[45] Date of Patent: Feb. 13, 1990

[54] OUTER TUBE WITH AT LEAST ONE BRACKET

[75] Inventors: Kazuo Yamamoto, Sagamihara; Hiroyuki Saito, Chigasaki, both of Japan

[73] Assignee: Nippon Seiko Kabushiki Kaisha, Tokyo, Japan

[21] Appl. No.: 291,140

[22] Filed: Dec. 28, 1988

[30] Foreign Application Priority Data

Dec. 28, 1987 [JP] Japan ............................. 62-199228[U]

[51] Int. Cl.[4] ................................................ B60R 21/00
[52] U.S. Cl. .................................... 280/804; 297/469
[58] Field of Search ........................ 280/804, 802, 803; 297/469

[56] References Cited

U.S. PATENT DOCUMENTS

| | | |
|---|---|---|
| 4,222,587 | 9/1980 | Goi et al. .............................. 280/804 |
| 4,256,331 | 3/1981 | Schwanz et al. ..................... 280/804 |
| 4,268,068 | 5/1981 | Suzuki et al. ........................ 280/804 |
| 4,411,449 | 10/1983 | Takada ................................. 280/804 |
| 4,418,940 | 12/1983 | Takada ................................. 280/804 |
| 4,575,120 | 3/1986 | Volk et al. ............................ 280/804 |
| 4,647,070 | 3/1987 | Yamamoto et al. ................. 280/804 |
| 4,655,477 | 4/1987 | Takada ................................. 280/804 |
| 4,659,107 | 4/1987 | Yokote ................................. 280/804 |

*Primary Examiner*—Kenneth R. Rice
*Attorney, Agent, or Firm*—Wegner & Bretschneider

[57] ABSTRACT

An outer tube is used to guide a drive member which serves to drive a slider. The outer tube is constructed of a resin-made cylindrical tube main body, two resin-made slip-out preventing portions formed at both ends of the tube main body respectively, and at least one resin-made bracket provided on the tube main body at a point between the slip-out preventing portions. The slip-out preventing portions and bracket are formed as unitary members with the tube main body.

11 Claims, 2 Drawing Sheets

OUTER TUBE WITH AT LEAST ONE BRACKET

BACKGROUND OF THE INVENTION (1) Field of the Invention:

This invention relates to the structure of an outer tube for guiding a drive member which is adapted to drive a webbing of a passive seat belt system for an automotive vehicle.

(2) Description of the Related Art:

A conventional passive seat belt system is illustrated by way of example in FIG. 5. A rail 8 is provided on an inner roofside 7 of a vehicle, whereby the rail 8 generally extends along a longitudinal axis of the vehicle. A slider 50 is provided in such a way that the slider 50 is allowed to move freely within the rail 8 along the longitudinal axis of the vehicle. A webbing 20 of the seat belt system is fastened to the slider 50, and the slider 50 is driven by a drive member composed of a tape, wire or the like arranged inside the rail 8. When an occupant wants to egress from the vehicle, the slider 50 is driven forward to move the webbing 20 away from a seat 10. When the occupant has entered the vehicle, the slider 50 is driven rearward so that the webbing 20 is moved toward the seat 10 to fasten the occupant. Movement of the slider 50 is controlled by detecting opening or closure of an associated door. Incidentally, numeral 14 indicates a drive unit for driving the drive member. The drive member extends through an outer tube 15 from the drive unit 14 to an anchor 13, whereby the drive member is guided by the outer tube 15 therebetween. Tube brackets 16 which are discrete members are fitted on the outer tube 15 so as to secure the outer tube 15 on a vehicle body.

On both ends of the outer tube 15, slip-out portions are formed respectively. The slip-out portions extend out in the form of a protuberance from an outer peripheral wall of the outer tube 15 and are attached to the anchor 13 and drive unit 14 respectively. Due to this structure, the tube brackets 16 must be fitted on the outer tube 15 before the slip-out portions are formed. This structure involves a potential problem that the outer tube 15 cannot be mounted on the vehicle body if the brackets 16 are fitted in a wrong direction or are accidentally omitted.

In addition, the tube brackets 16 move downwardly when the outer tube 1 is held upright subsequent to the application of the brackets 16 to the outer tube 15. It has hence been necessary to lift the brackets 16 to their attachment positions upon mounting the outer tube 15 on the vehicle body. Accordingly, additional mounting steps are required and the mounting work was cumbersome. It may be contemplated of winding tapes on the outer tube 15 to prevent the brackets 16 from moving downward. This solution however leads to a increase in the mounting cost.

SUMMARY OF THE INVENTION

An object of this invention is to provide an outer tube and its associated tube bracket or brackets as unitary members, so that the tube bracket or brackets are held in place on the outer tube and the work for mounting the outer tube on a vehicle body can be simplified.

In one aspect of this invention, there is thus provided an outer tube for guiding a drive member adapted to drive a slider to which an occupant-restraining webbing is fastened. The outer tube comprises a resin-made cylindrical tube main body, two resin-made slip-out preventing portions formed at both ends of the tube main body respectively, and at least one resin-made bracket provided on the tube main body at a point between the slip-out preventing portions. The slip-out preventing portions and bracket are formed as unitary members with the tube main body.

Since the tube bracket is not movable, it is no longer required to adjust the position of the tube bracket upon mounting the outer tube on a vehicle body. The outer tube can be mounted in less steps, whereby its mounting work can be facilitated.

Conventional outer tubes require at least one tube bracket machined in advance by a press. Since slip-out preventing portions are formed after fitting the bracket on the tube, fitting of the bracket in a wrong direction or accidental omission of the bracket has heretofore been unavoidable. Their formation as unitary members has completely obviated this problem.

In addition, the overall fabrication process of the outer tube has been simplified. The unitary formation of the tube main body and tube bracket has also improved the dimensional accuracy of the tube and the positional accuracy of the bracket.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENTS

Figure 1:
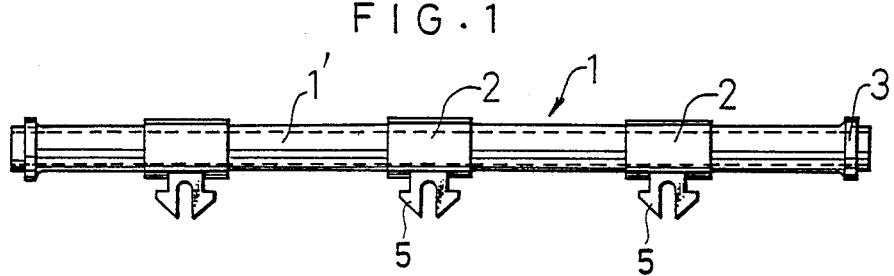
FIG. 1 is a front view of an outer tube according to a first embodiment of this invention.

The outer tube according to the first embodiment of this invention will be described with reference to FIG. 1. The outer tube is generally identified at numeral 1. Designated at numeral 1' is a tube main body, through which a wire (not shown) is inserted as a drive member for driving a slider, namely, a webbing fastened to the slider. The outer tube 1 is mounted on a vehicle body to guide the wire between the anchor 13 and drive unit 14 as described above. Numeral 2 indicates brackets for mounting the tube main body 1' on the vehicle body. Each bracket 2 has a claw 5 at a free end thereof, whereby the outer tube 1 can be mounted on the vehicle body by an one-touch operation. Designated at numeral 3 are slip-out preventing portions. The slip-out preventing portions 3,3 engage, for example, U-shaped grooves formed in the anchor 13 and drive unit respectively, so that the slip-out preventing portions 3,3 prevent the outer tube 1 from slipping out of the anchor 13 and drive unit 14. The tube brackets 2 can be secured on the tube main body 1' by forming the tube main body 1' and tube brackets 2 as integral members by a resin molding machine.

Figure 2:
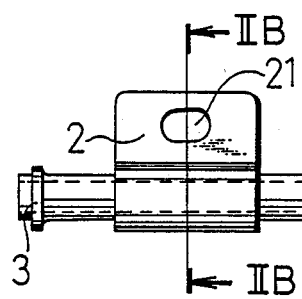
FIG. 2(A) is a front view of an outer tube according to a second embodiment of this invention.
FIG. 2(B) is a transverse cross-section of the outer tube of FIG. 2(A), taken in the direction of arrows IIB—IIB of FIG. 2(A)
Figure 2:
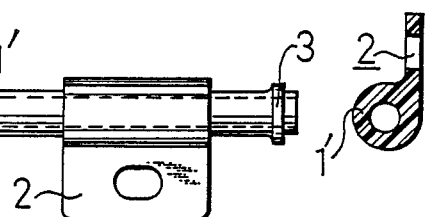

Referring next to FIG. 2(A) and FIG. 2(B), the outer tube according to the second embodiment of this invention will be described. Like the first embodiment of FIG. 1, a tube main body 1' and tube brackets 2 are formed as integral members by a resin molding machine. In the second embodiment, the tube brackets 2 define a mounting hole 21 so that the outer tube of the second embodiment is mounted on a vehicle body by bolts. It is here that the second embodiment is mainly different from the first embodiment. FIG. 2(B) shows that the tube main body 1' and tube brackets 2 are integral.

Figure 3:
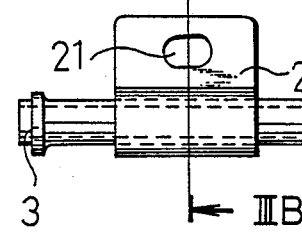
FIG. 3(A) is a front view of an outer tube according to a third embodiment of this invention.
FIG. 3(B) is a transverse cross-section of the outer tube of FIG. 3(A), taken in the direction of arrows IIIB—IIIB of FIG. 3(A)
Figure 3:
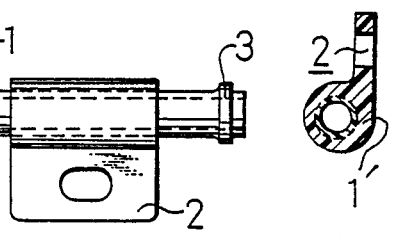

Reference is next had to FIG. 3(A) and FIG. 3(B) which illustrate the outer tube according to the third embodiment of this invention. After forming a tube main body 1' by extrusion, slip-off preventing portions 3,3 are formed at both end portions of the tube main body 1'. Thereafter, tube brackets 2,2 for mounting the outer tube 1 on a vehicle body are formed by injection molding or the like. Upon formation of the tube brackets 2,2, an outer peripheral wall of the tube main body 1' is molten at the corresponding locations so that the tube main body 1' and brackets 2,2 are united together. FIG. 3(B) shows that the tube main body 1' and tube bracket 2 are fused together at their boundary to form a unitary structure similar to that depicted in FIG. 2(B).

Incidentally, in order to ensure the accurate positioning of the brackets 2,2 relative to the length of the tube main body 1', outwardly-projecting portions may be formed respectively at prescribed positions on the tube main body 1' after extrusion of the tube main body 1'.

Figure 4:
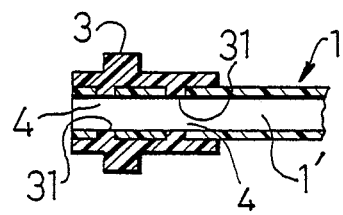
FIG. 4 is a fragmentary longitudinal cross-section of an outer tube according to a fourth embodiment of this invention.
Figure 5:
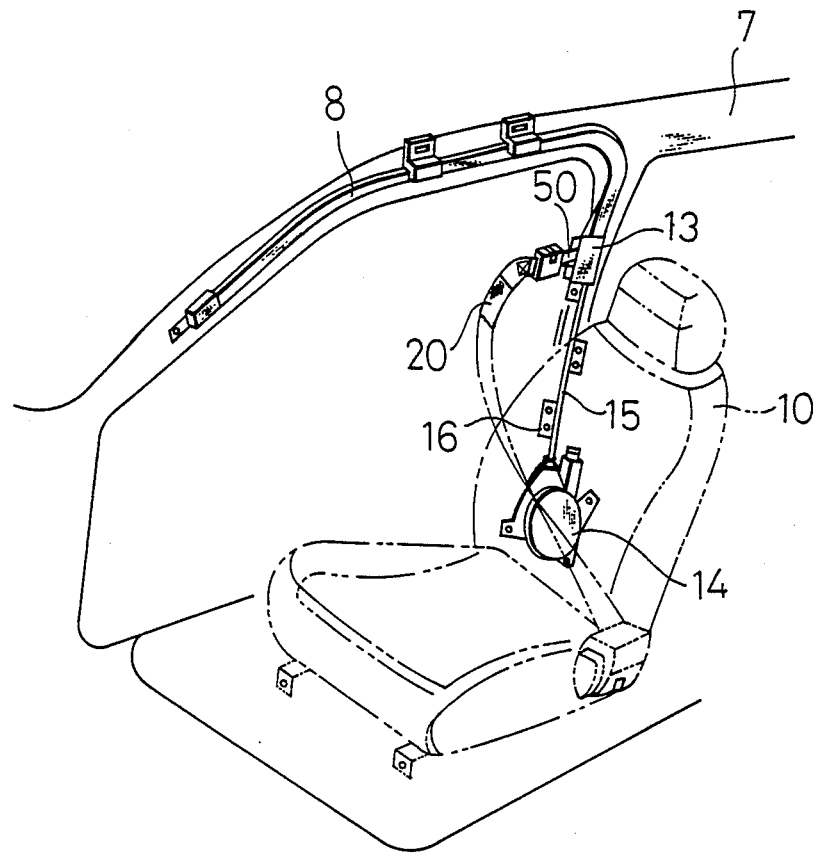
FIG. 5 is a simplified perspective view showing the overall construction of a passive seat belt system.

The outer tube according to the fourth embodiment of this invention will now be described with reference to FIG. 4. After extrusion of a tube main body 1', a slip-out preventing hole 4 is bored in each end portion of the tube main body 1'. Thereafter, slip-out preventing portions 3,3 are formed at both end portions of the tube main body 1' and at the same time, brackets (not shown) are also formed at plural locations between the slip-out preventing portions 3,3. Each slip-out preventing portion 3 has an inwardly-extending rib 31 which corresponds to the slip-out preventing hole 4. Owing to the fitting of the rib 31 in the hole 4, the unitary structure of the tube main body 1' and the slip-out preventing portions 3,3 has been ensured further.

We claim:

1. An outer tube for guiding a drive member adapted to drive a slider to which an occupant-restraining webbing is fastened, comprising:
   a resin-made cylindrical tube main body;
   two resin-made slip-out preventing portions formed at both ends of the tube main body respectively; and
   at least one resin-made bracket provided on the tube main body at a point between the slip-out preventing portions;
   said slip-out preventing portions and bracket being formed as unitary members with the tube main body.

2. The outer tube as claimed in claim 1, wherein the tube main body, slip-out preventing portions and bracket are all made of a resin of the same kind.

3. The outer tube as claimed in claim 1, wherein the bracket is formed of a resin different in kind from the tube main body.

4. The outer tube as claimed in claim 3, wherein the tube main body is formed by extrusion and the bracket is formed as a unitary member by injection molding on the tube main body.

5. The outer tube as claimed in claim 1, wherein the slip-out preventing portions are formed of a resin of a kind different in kind from the tube main body.

6. The outer tube as claimed in claim 5, wherein the tube main body defines at least one slip-out preventing hole at each end portion thereof and each of the slip-out preventing portions is provided at the corresponding slip-out preventing hole.

7. The outer tube as claimed in claim 5, the tube main body is formed by extrusion and the slip-out preventing portions are formed as unitary members by injection molding on the tube main body.

8. The outer tube as claimed in claim 1, wherein the bracket has a claw capable of establishing an engagement with a corresponding mounting base.

9. The outer tube as claimed in claim 1, wherein the bracket defines a mounting hole through which a mounting member may extend.

10. The outer tube as claimed in claim 1, wherein the slip-out portions have a portion extending out in the form of a protuberance from an outer peripheral surface of the tube main body.

11. The outer tube as claimed in claim 10, wherein the slip-out portions have a rib which extends along the outer peripheral surface of the tube main body and in a direction transverse the length of the tube main body.

* * * * *